Sept. 14, 1937. A. E. IKE 2,093,048
INSTRUMENT FOR MEASURING LENGTHS AND ANGLES
Filed Oct. 9, 1935 4 Sheets—Sheet 1

Inventor
A. E. Ike.
By Lacey & Lacey, Attorneys

Sept. 14, 1937.  A. E. IKE  2,093,048
INSTRUMENT FOR MEASURING LENGTHS AND ANGLES
Filed Oct. 9, 1935  4 Sheets-Sheet 4

Inventor
A. E. Ike.
By Lacey & Lacey,
Attorneys

Patented Sept. 14, 1937

2,093,048

UNITED STATES PATENT OFFICE 2,093,048

INSTRUMENT FOR MEASURING LENGTHS AND ANGLES

Arthur E. Ike, Sidney, Ohio

Application October 9, 1935, Serial No. 44,282

11 Claims. (Cl. 33—98)

This invention relates to an instrument for measuring lengths and angles and while it is particularly adapted for solving problems in geometry and trigonometry, it may be used whenever it is desired to very accurately measure a straight line or lay off triangles or other figures formed by lines extending in minutely computed angular relation to each other.

One object of the invention is to provide a measuring instrument including linear measures so associated with each other that they may be adjusted to permit a straight line to be very accurately measured and also so adjusted that cooperating measures extending in crossed and intersecting relation to each other may be moved into desired angular relation to each other and secured in the set position.

Another object of the invention is to provide improved means for slidably and pivotally connecting cooperating or companion linear measures so constructed that when one is slid longitudinally of the other to an adjusted position for measuring a straight line of a desired length, the distance may be measured not only in inches or relatively large fractions thereof but also measured in minute fractions of an inch such as one or more thousandths of an inch.

Another object of the invention is to provide improved means for pivotally connecting linear measures for angular adjustment relative to each other the said means being so constructed that one linear measure may be not only easily moved to an angle of a predetermined number of degrees relative to the other, but also the angle computed in minutes and seconds, as well as degrees.

Another object of the invention is to provide the means for slidably and pivotally connecting the linear measure with improved means for computing one or more thousandths of an inch and also with improved means for registering minutes and seconds and thus permit adjustments for thousandths of an inch or minute portions of degrees to be very accurately laid off and likelihood of errors eliminated. It will thus be seen that with this improved instrument, a triangle having the lengths of two of its sides and the angular relation thereof to each other may be easily laid off with great accuracy and the length of the third side of the triangle and its angular relation to the other two sides ascertained with equal accuracy.

The invention is illustrated in the accompanying drawings, wherein

Figure 8 is a view illustrating a problem which may be solved with the improved instrument.

Figure 1:
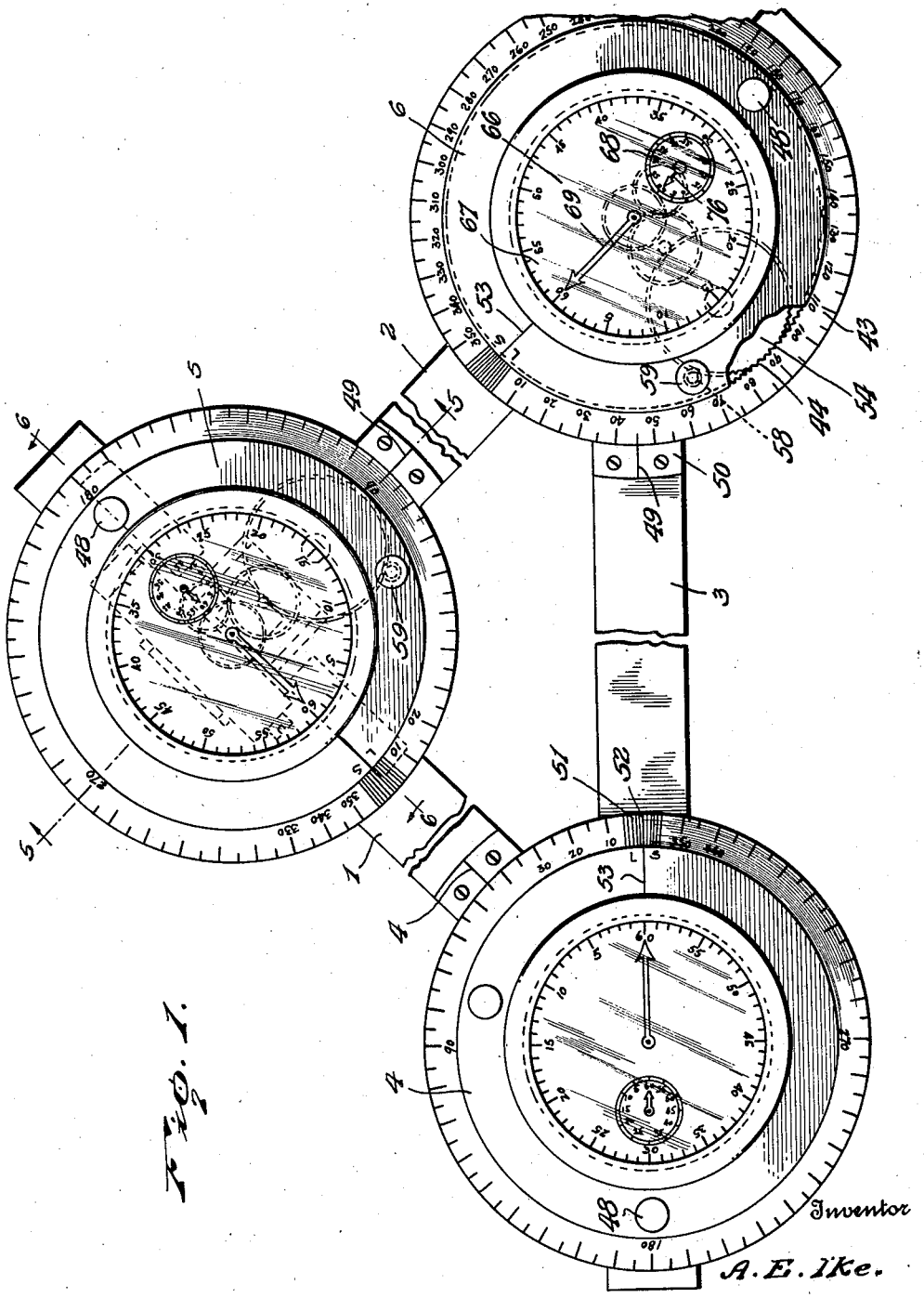
Figure 1 is a plan view looking at the instrument from the side thereof employed when setting linear measures in desired angular relation to each other.

This improved instrument is of triangular formation and consists, briefly, of linear measures 1, 2 and 3 which are disposed in intersecting and crossed relation to each other and slidably and pivotally mounted by mountings indicated in general by the numerals 4, 5 and 6. The linear measure 1 and mounting 4 constitute one unit of the instrument, the linear measure 2 and mounting 5 constitute a second unit of the instrument, and the linear measure 3 and mounting 6 constitute a third unit. The linear measure of each unit is mounted so that it may be swung circumferentially about its companion mounting and is slidable diametrically through the mounting of a second unit with one linear measure in a plane higher than the other so that when a mounting is slid longitudinally upon the linear measure of a companion unit, the linear measure of the second unit may extend in crossed and intersecting relation to the linear measure of the first unit. It will thus be seen that when the three units are assembled in operative relation to each other, they will define a triangular structure consisting of linear measures which may be set for length and angular relation to each other and a triangle of desired dimensions produced.

Figure 2:
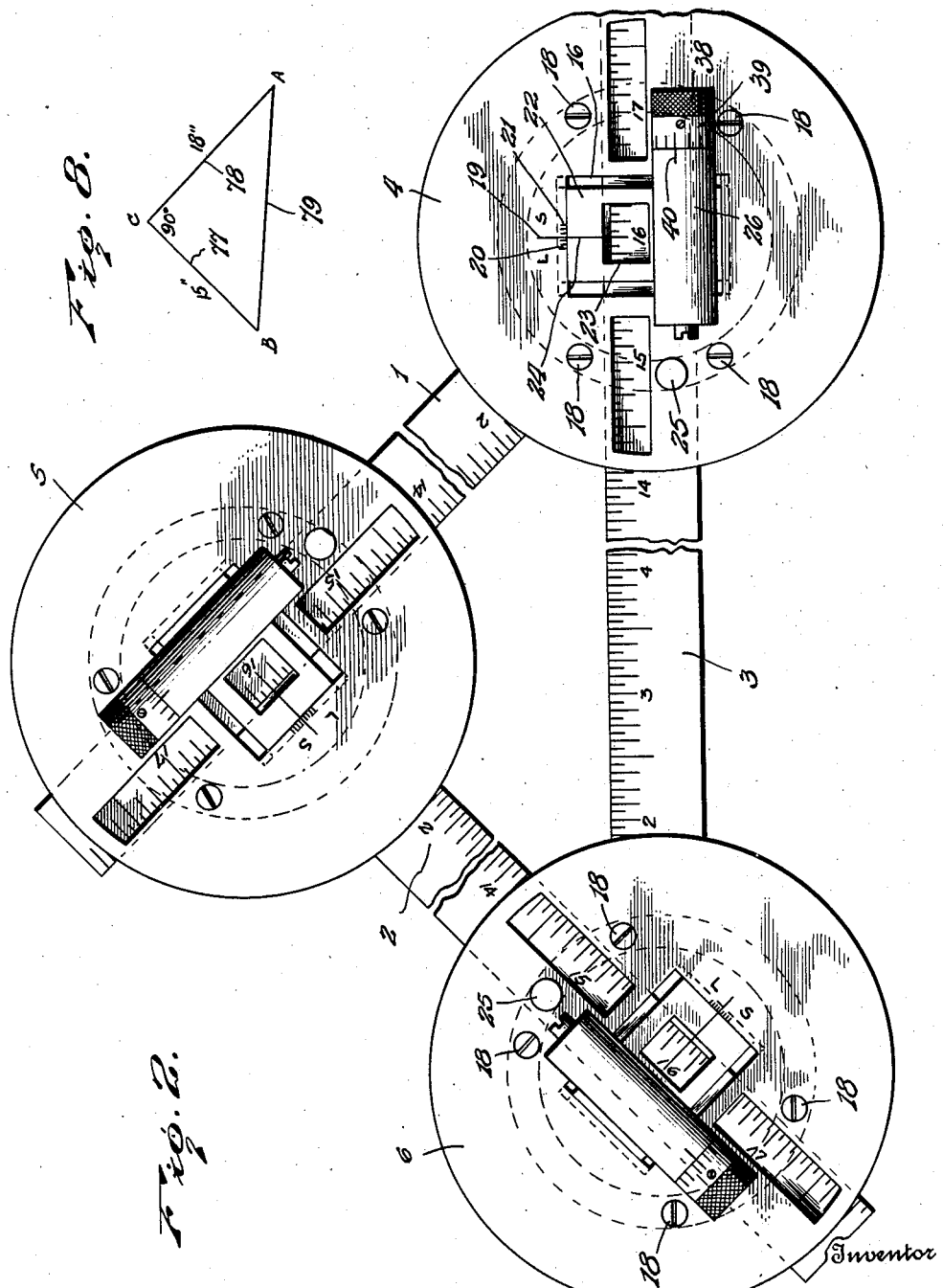
Figure 2 is a plan view looking at the other side of the instrument which is employed when setting linear measures for length.
Figure 3:
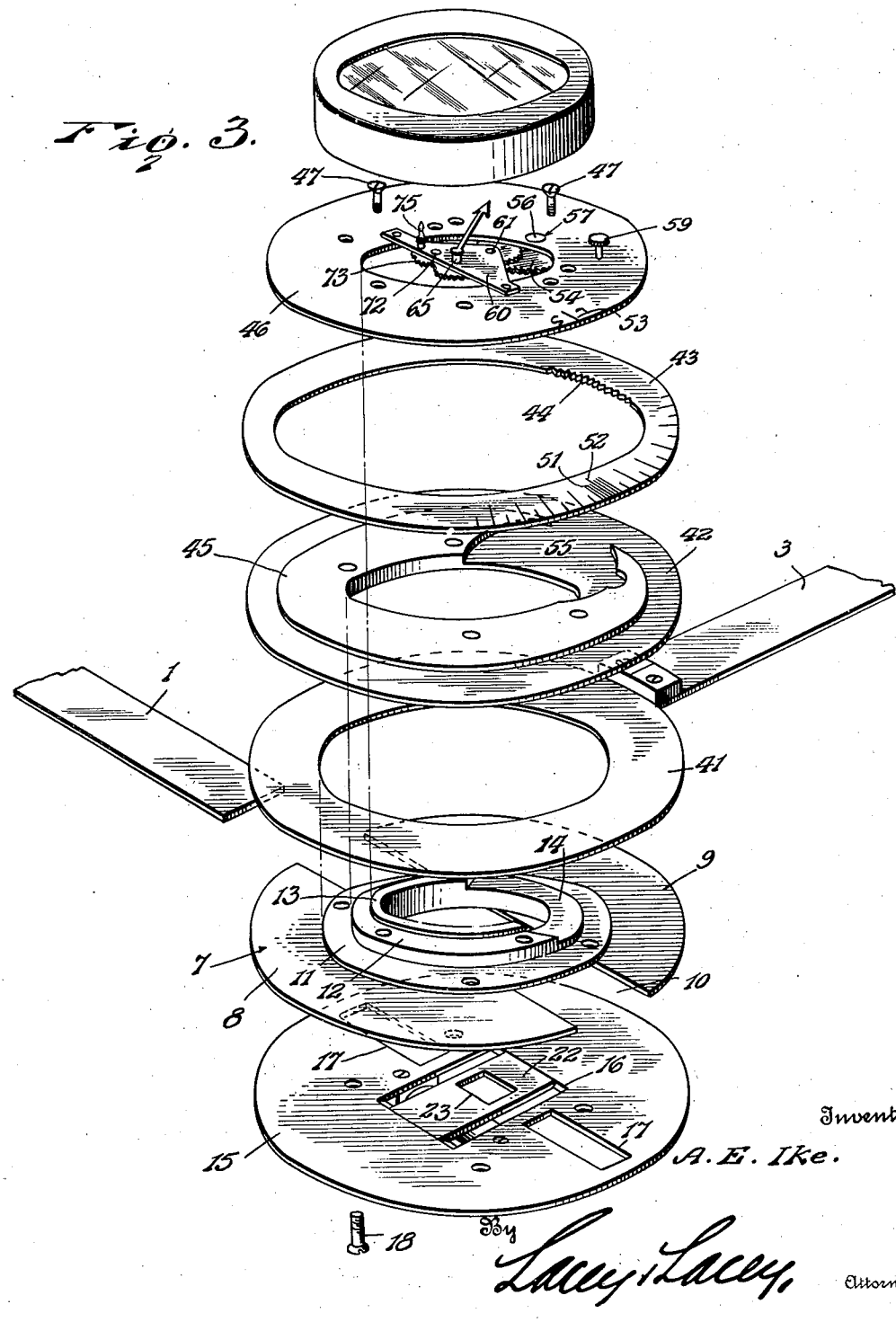
Figure 3 is a perspective view showing elements constituting the means for slidably and pivotally connecting companion linear measures with the elements separated from each other and disposed in their proper positions one above another.

Each of the mountings is constructed of companion elements illustrated in Figure 3 and referring to this figure it will be seen that the mounting has a foundation plate 7 formed of plate sections 8 and 9 which are formed with arcuate outer marginal edges and straight cut inner edges spaced from each other to provide a channel 10 to slidably receive a linear measure which may be the measure 1. A collar 11 is riveted or otherwise rigidly secured upon the plate sections 8 and 9 to hold the plate sections in spaced relation to each other and is formed with an upstanding annular shoulder 12 spaced from its outer marginal edge and carrying a flange 13 extending partially about the inner peripheral edge of the shoulder. It should also be noted that for a portion of its circumference the shoulder 12 has been reduced in thickness, as shown at 14, and forms a seat or pocket to receive a portion of a gear, as will be hereinafter set forth, and ends of the flange terminate at ends of the pocket. A face plate 15 is disposed against the under face of the foundation plate and formed with a center opening 16 and other openings 17 at opposite sides of the center opening, and upon referring to Figure 2 it will be seen that when the face plate is secured against the foundation plate by the screws or bolts 18, the linear measure 1 will be slidable through the channel 10 and the inch and fraction marks of the scale provided upon the linear measure will be disclosed through the openings 16 and 17.

The under face of the plate 15 is provided with a centering mark 19 and at opposite sides of this mark with shorter scale markings 20 and 21 which are spaced twenty-five thousandths of an inch apart and there have also been provided the letters "L" and "S" associated with the shorter scale markings. A gage plate 22 is slidably received in the opening 16 and formed with beveled end edges which bear against correspondingly beveled marginal edges of the opening 16 so that while the gage plate may be slid in the opening 16 it will be prevented from moving out of the opening. A sight opening 23 formed in the gage plate 22 discloses a portion of the linear gage with which it cooperates, as best shown in Figure 2, and across the exposed outer face of the gage plate there has been provided a line or marking 24 which may be disposed in alinement with the gage marking 19 or a selected one of the shorter markings 20 or 21. By this arrangement the gage plate may be adjusted to dispose its gage line or marking 24 in alinement with the marking 19 and if it is desired to plot a triangle having one side exactly sixteen inches long, the sixteen inch mark of the linear measure may be moved into alinement with the mark 24 and the set screw 25 then tightened to hold the linear measure in its adjusted position. If the line or side of a triangle is to be one or more thousandths of an inch longer or shorter than sixteen inches, the gage plate will be shifted to move its gage marking 24 the desired number of thousandths of an inch toward the letter "L" or the letter "S" and when the sixteen inch mark of the linear gage is alined with the gage marking 24, the effective length of the linear gage will be the desired number of thousandths of an inch longer or shorter. It will be obvious that the same rule applies if the distance measured is to be a desired number of thousandths of an inch longer or shorter than a fraction of an inch, such as 15¾ths inches or the like. The linear measure when set may not only be used for plotting one side of a triangle but also for accurately setting a pair of dividers or other drawing instrument and if this is to be done, the gage plate will be properly set, the linear measure then moved longitudinally until a selected marking thereof registers with the marking 24, and legs or arms of the divider may be accurately spaced from each other the desired distance.

In order to adjust the gage plate, there has been provided a cylindrical casing 26 which extends in crossed relation to the opening 16 with its end portions secured to saddles 27 by screws 28 which, in addition, to securing the casing to the saddles, also serve to hold the saddles in engagement with the face plate 15 and likewise serve to secure bushings 29 and 30 in end portions of the casing. A block 31 having a threaded bore to receive a threaded stem 32 is mounted in the casing with a portion thereof projecting through a slot 33 formed in the casing and secured to a lug 34 of the gage plate 22 by screws 35. Therefore, when the stem 32 is rotated, the gage plate will be slid longitudinally in the opening 16 and its mark 24 moved in a desired direction relative to the gage mark 19 and shorter gage markings 20 or 21. One end of the threaded stem is screwed into a threaded socket formed in a screw 36 which serves as a drum to rotatably mount this end of the stem and is rotatably received in the bushing 29. The other end of the stem is rotatably engaged through the bushing 30 and has an enlarged portion 37 or neck terminating in a turning head 38. A collar 39 is secured about the neck 37 to turn with the neck and head and by providing a gage marking 40 upon the casing as shown in Figure 2, the extent to which the stem has been rotated may be determined when setting the gage plate. The collar 39 carries twenty-five gage marks and a complete rotation of the head 38 and stem 32 will shift the plate 22 twenty-five thousandths of an inch. Turning the head and stem a portion of a rotation indicated by the distance between the gage markings of the collar 39 will shift the gage plate 22 one thousandth of an inch. It will thus be seen that when plotting a triangle having the lengths of two sides known and their angles with respect to the intersecting sides also known, two of the linear measures may be very accurately set for length and the length of the third side determined with equal accuracy.

Each linear measure is to be mounted for swinging movement about its cooperating mounting for angular adjustment relative to another linear measure and in order to do so, each linear measure carries at one end a metal ring 41. This ring which has been shown at one end of the linear gage 3 in Figure 3, fits against the plate sections 8 and 9 about the collar 11 and is overlapped by a mounting plate 42 which is secured upon the collar 11 by the bolts 18 extending upwardly through alined openings formed in the face plate 15, plate sections 8 and 9 of the foundation plate, and the mounting plate. A gage ring 43 having gear teeth 44 provided upon its inner margin for a portion of its circumference rests loosely upon the mounting plate 42 about the thickened portion 45 thereof and is retained in place by a face plate 46 which rests upon the thickened portion of the mounting plate and is secured not only by the bolts 18 but also by additional screws 47. A set screw 48 which is threaded through alined openings formed in the face plate 46 and the thickened portion of the mounting plate 42 is provided for abutting engagement with the ring 41 and securely holding the ring in a set position and, therefore, the linear measure may be swung about the mounting until the gage mark 49 provided upon the blocks 50 carried by the linear measure is in alinement with a predetermined degree mark upon the upper or outer face of the gage ring 43 and the linear measure firmly secured in a set position. It is desired to permit the gage ring to be accurately set and, therefore, at one point about its circumference it has been provided with groups of minute markings, as shown at 51, with the 360° mark 52 at the center of this group of markings. The face plate 46 carries a gage mark 53 having the letters "L" and "S" at opposite sides thereof and when this mark 53 is alined with the mark 52 the gage ring will be in its neutral or normal position and by swinging the linear measure about the mounting until the gage mark 49 carried by its block 50 is moved into alinement with a predetermined degree mark which may be the mark indicating 45°, the angularly adjustable linear measure will be disposed at exactly 45° to the linear measure which is slidable diametrically through the mounting.

For very accurate work, it is necessary to adjust the gage ring a predetermined number of minutes and seconds longer or shorter than the major degree and in order to do so, there has been provided a gear 54 which meshes with the gear teeth 44 of the gage ring and is rotatably received in a pocket 55 formed in the thickened portion 45 of the mounting plate with its stub shaft or standard 56 rotatably engaged in an opening 57 formed in the face plate 46. This gear 54 meshes with a small pinion 58 carried by a turning shaft 59 which is journaled through a bearing carried by the face plate and has a head or knob at its outer end in order that it may be easily grasped and the shaft or stem rotated to impart rotary motion to the gear 54 and thus turn the gear ring about the mounting plate until the mark 52 moves out of alinement with the mark 53 in the direction of the letter "L" for a fraction of a greater degree or toward the letter "S" for a fractionally shorter degree. A bridge 60 formed of metal is riveted or otherwise rigidly secured upon the face plate 46 in bridging relation to the central opening of this plate and this bridge carries a rotatably mounted stem or standard 61 upon which are fixed a small pinion 62 meshing with the gear 54 and a gear 63 which meshes with a pinion 64 at the lower or inner end of a shaft 65. The shaft 65 is journaled through the bridge with its upper end portion extending through a dial 66 which corresponds to the dial usually provided upon a watch or clock and has minutes marked about its margin, as shown at 67, and auxiliary dial markings for seconds, as shown at 68. A minute hand 69 extends radially from the outer or upper end of the shaft 65 in cooperating relation to the minute marks constituting the scale about the margin of the dial 66. The shaft 65 carries a large gear 70 between the dial 66 and the bridge 60 which meshes with a small pinion 71 carried by a countershaft 72 journaled through an opening formed in the bridge, and above the pinion 71 the shaft 72 carries a gear 73 meshing with a small pinion 74 carried by a shaft 75 which is journaled through the bridge and has its upper or outer end portion extending through the dial at the center of the second scale and carrying a hand 76 corresponding to the second hand of a watch. It will thus be seen that when the stem 59 is turned to rotate the gear 54 and turn the gage ring 43 about the mounting plate, rotary motion will be transmitted to the train of gearing through the medium of the pinion 62 which meshes with the gear 64 and the minute hand 69 and second hand 73 will be turned to indicate the number of minutes and seconds the mark 52 of the gage ring has been shifted toward the letter "L" or the letter "S" of the face plate. The gage ring may, therefore, be very accurately set for a predetermined number of minutes or seconds longer or shorter than its normal position and if the angularly adjustable linear measure is swung about the mounting to move the mark 49 of its block 50 into registry with the degree mark 45 or any other predetermined degree mark, the instrument will indicate that the angularly adjustable linear measure extends at an angle of 45° and a predetermined number of minutes and seconds to the linear measure slidably engaged with the mounting.

Figure 4:
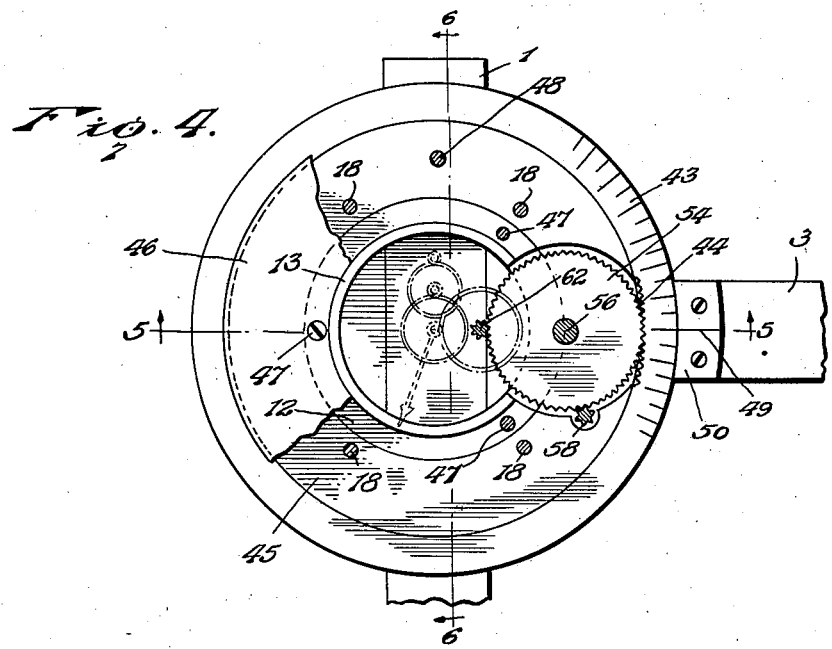
Figure 4 is a view taken through the means for slidably and pivotally connecting the linear measures along the line 4—4 of Figure 5.
Figure 5:
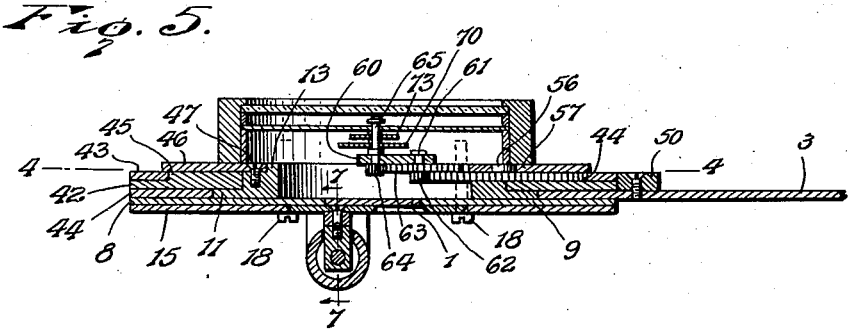
Figure 5 is a transverse sectional view taken along the line 5—5 of Figure 4.
Figure 6:
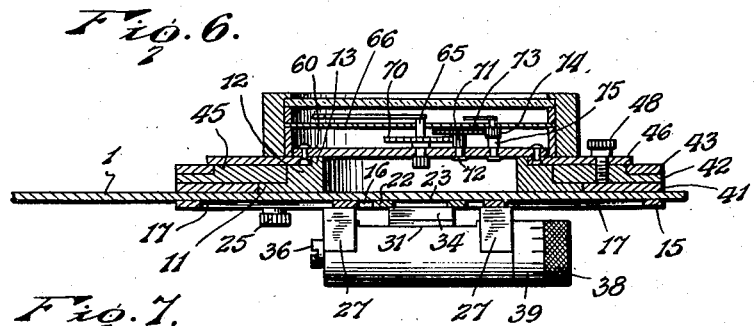
Figure 6 is a sectional view taken at right angles to Figure 5 along the line 6—6 of Figure 4.
Figure 7:
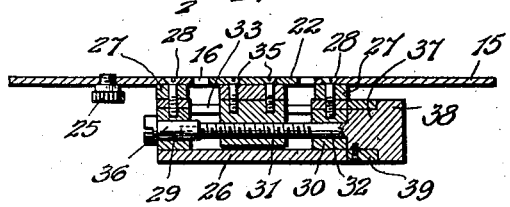
Figure 7 is a sectional view taken along the line 7—7 of Figure 5.

When this instrument is in use for laying off a triangle such as shown in Figure 4, the operation is as follows: This angle has one side 77 which is fifteen inches long and is disposed at an angle of 90° to the side 78 which is eighteen inches long. The problem is to determine the length of the side 79 and the angle of this side relative to the sides 77 and 78. When solving this problem the instrument is disposed, as shown in Figure 2, and the linear measure 2 will be slid through the mounting 6 until the fifteen inch mark is exactly alined with the mark 24 of the gage plate 22 of this mounting. As the side 77 is exactly fifteen inches in length, the mark 24 of the plate 22 of the mounting 6 will be in exact alinement with the mark 19, whereas if the side 77 were a certain number of thousandths of an inch longer or shorter than fifteen inches the plate 22 of the mounting 6 would be shifted toward the letter "L" or the letter "S" of this mounting until moved the proper number of thousandths of an inch and although the fifteen inch mark would still be disposed in alinement with the mark 24 of the plate 22, the linear measure 2 would be accurately set for the proper number of thousandths of an inch longer or shorter than fifteen inches when secured by tightening the set screw 25. The linear gage 35 will then be similarly set through the mounting 5 for eighteen inches and the set screw 25 of this mounting tightened to secure it in its set position and the instrument turned to the position shown in Figure 1. The linear measure 2 will now be swung about the mounting 5 until its mark 49 registers with the degree mark 90 of the gage ring 43 of the mounting 5 and the linear measures 1 and 2 will extend at an angle of 90° to each other and as the minute and second hands both point to "60" it will be known that the linear measures are at an angle of exactly 90° relative to each other. In case the angle desired were 90° and a certain number of minutes and seconds, it would be merely necessary to turn the stem 59 of the mounting 5 to adjust the gage ring thereof in the proper direction to move the mark 52 away from the mark 53 toward the letter "L" indicating longer or toward the letter "S" indicating shorter until the minute and second hands register the desired number of minutes and seconds and with the mark 49 of the linear measure registering with the degree 90 of the gage ring, the two linear measures 1 and 2 would be disposed at an angle of 90° and a certain number of minutes and seconds relative to each other. During adjustment of the linear measures 1 and 2 for length and angular relation to each other, the linear measure 3 will slide through the mounting 4 and turn about the mounting 6, and it is then merely necessary to note the angle gages of the mountings 4 and 6 and the length gage of the mounting 4 and it will be found that the side 79 of the triangle has a length of 23.43 inches and extends at an angle of 39° forty-eight minutes and nineteen seconds relative to the side 77. It will thus be seen that with this instrument, the unknown length of a side of a triangle and its angular relation to the other sides of the triangle of known length and the angular relation to each other may be very easily and quickly determined. Other problems in geometry and trigonometry can be solved with equal ease. While it has been stated that the instrument may be used for solving problems in geometry and trigonometry, it is to be understood it is not limited to this use but may be used for many purposes by mathematicians, map makers, machinists, carpenters, and others who need to very accurately measure lengths and angles.

Having thus described the invention, what is claimed as new is:

1. An instrument for measuring lengths and angles comprising a linear measure having a ring at one end, a second linear measure, and a mounting for pivotally and slidably connecting the linear measures, the ring of the first linear measure being rotatable about the mounting whereby the linear measures may be disposed in desired angular relation to each other, means for releasably holding the ring stationary with the first linear measure in a set position, a gage carried by said mounting for indicating the angular relation of the measures to each other, means for adjusting said gage for effecting a minute angular adjustment of the first measure, the second linear measure being longitudinally slidable through the mounting diametrically thereof, means for effecting a minute adjustment of the second measure and means for releasably holding the second linear measure in its longitudinally adjusted position.

2. An instrument for measuring lengths and angles comprising a linear measure having a ring at one end, a second linear measure, and a mounting for pivotally and slidably connecting the linear measures, the ring of the first linear measure being rotatable about the mounting whereby the linear measures may be disposed in desired angular relation to each other, means for releasably holding the ring stationary with the first linear measure in a set position, a gage ring carried by said mounting for indicating a major angular adjustment of the first linear measure, means for rotatably adjusting the gage ring whereby a minute angular adjustment of the first measure may be effected, the second linear measure being slidable through the mounting diametrically thereof for a major longitudinal adjustment, means carried by the mounting for effecting a minute longitudinal adjustment of the second linear measure, and means for releasably holding the second linear measure in a set position.

3. An instrument for measuring lengths and angles comprising a linear measure having a ring at one end, a second linear measure, and a mounting for pivotally and slidably connecting the linear measures, said mounting consisting of a structure having the ring rotatably carried thereby and the second linear measure slidable diametrically therethrough, a gage carried by the structure for gaging longitudinal adjustment of the second measure, said gage being adjustable diametrically of the structure for effecting a minute longitudinal adjustment of the second measure, means for releasably holding the second measure in a set position, a gage ring carried by the structure for gaging angular adjustment of the first measure, means for rotating the gage ring to an adjusted position for effecting a minute angular adjustment of the first measure and indicating the extent to which the gage ring has been adjusted, and means for releasably holding the first measure in a set position.

4. An instrument for measuring lengths and angles comprising a linear measure having a ring at one end, a second linear measure, and a mounting for pivotally and slidably connecting the linear measures, said mounting consisting of a structure having the ring rotatably carried thereby and the second linear measure slidable diametrically therethrough, an opening being formed in the structure for exposing a portion of the second measure, a gage in the opening adjustable longitudinally of the second measure whereby a minute adjustment of the second gage may be effected, a fastener carried by the structure for securing the second measure in a set position, means carried by the structure for gaging angular adjustment of the first measure, and means carried by the structure for releasably securing the first measure in a set position.

5. An instrument for measuring lengths and angles comprising a linear measure having a ring at one end, a second linear measure, and a mounting for pivotally and slidably connecting the linear measures, said mounting consisting of a structure having the ring rotatably carried thereby and the second linear measure slidable diametrically therethrough, an opening being formed in the structure for exposing a portion of the second measure, a gage in the opening adjustable longitudinally of the second measure whereby a minute adjustment of the second gage may be effected, a fastener carried by the structure for securing the second measure in a set position, a gage ring rotatably carried by the structure in cooperating relation to the first measure for indicating angular adjustment of the first measure, means for rotating the gage ring to an adjusted position and indicating the extent to which it has been turned whereby a predetermined minute angular adjustment of the said first measure may be effected, and means carried by the structure for releasably securing the ring stationary with the first measure in an angularly set position.

6. An instrument for measuring lengths and angles comprising a linear measure having a ring at one end, a second linear measure, and a mounting for pivotally and slidably connecting the linear measures, said mounting consisting of a structure having the ring rotatably carried thereby and the second linear measure slidable diametrically therethrough, a gage carried by the structure for gaging longitudinal adjustment of the second measure, said gage being adjustable diametrically of the structure for effecting a minute longitudinal adjustment of the second measure, means for releasably holding the second measure in a set position, a gage ring carried by the structure for gaging angular adjustment of the first measure, a train of gearing having a gear engaging the gage ring and an actuating element disposed externally of the structure whereby the gearing may be driven to turn the gage ring to an adjusted position and a minute angular adjustment of the first measure effected, a dial, hands associated with the gearing and in operative relation to the dial for indicating the extent to which the gage ring has been turned, and means carried by the structure for engaging the ring of the first measure and securing the same against turning with the first measure in an angularly adjusted position.

7. An instrument for measuring lengths and angles comprising a linear measure having a ring at one end, a second linear measure, and a mounting for pivotally and slidably connecting said measures, said mounting consisting of a structure having a foundation plate, a mounting plate disposed against said foundation plate, said ring being rotatably mounted between the foundation plate and mounting plate to mount the first measure for swinging movement to angularly adjusted positions, a face plate disposed against the foundation plate at the other side thereof from the mounting plate, the second measure extending between the face plate and foundation plate and slidable longitudinally radially thereof, a gage ring rotatably carried by said mounting plate for gaging angular adjustment of the first measure, means for turning the gage ring to an adjusted position and indicating adjustment thereof, and means for securing the measures in adjusted positions.

8. An instrument for measuring lengths and angles comprising a linear measure having a ring at one end, a second linear measure, and a mounting for pivotally and slidably connecting said measures, said mounting consisting of a structure having a foundation plate, a mounting plate disposed against said foundation plate, said ring being rotatably mounted between the foundation plate and mounting plate to mount the first measure for swinging movement to angularly adjusted positions, a face plate disposed against the foundation plate at the other side thereof from the mounting plate, a channel being formed between the mounting plate and face plate radially thereof to slidably receive the second measure, an opening being formed in the face plate to expose a portion of the second measure, a gage plate slidable in the opening and overlying the second measure, means for adjusting the gage plate in the opening radially of the face plate, means to secure the second measure in a longitudinally adjusted position, and means carried by the mounting plate for gaging angular adjustment of the first measure.

9. An instrument for measuring lengths and angles comprising a linear measure having a ring at one end, a second linear measure, and a mounting for pivotally and slidably connecting said measures, said mounting consisting of a structure having a foundation plate, a mounting plate disposed against said foundation plate, said ring being rotatably mounted between the foundation plate and mounting plate to mount the first measure for swinging movement to angularly adjusted positions, a face plate disposed against the foundation plate at the other side thereof from the mounting plate, a channel being formed between the mounting plate and face plate radially thereof to slidably receive the second measure, an opening being formed in the face plate to expose a portion of the second measure, a gage plate slidable in the opening and overlying the second measure, a casing carried by the face plate and overlying the opening and gage plate and formed with an opening facing the gage plate, a block carried by the gage plate and extending into said casing and formed with a threaded bore, a stem rotatably carried by said casing axially thereof and threaded through the bore of the block for shifting the gage plate longitudinally of the second measure when the stem is turned, and means carried by the mounting plate for gaging angular adjustment of the first measure.

10. An instrument for measuring lengths and angles comprising a linear measure having a ring at one end, a second linear measure, and a mounting for pivotally and slidably connecting said measures, said mounting consisting of a structure having a foundation plate, a mounting plate disposed against said foundation plate, said ring being rotatably mounted between the foundation plate and mounting plate to mount the first means for swinging movement to angularly adjusted positions, a face plate disposed against the foundation plate at the other side thereof from the mounting plate, the second measure extending between the face plate and foundation plate and slidable longitudinally radially thereof, an opening being formed in the face plate for exposing a portion of the second measure, a gage carried by the face plate at the opening for gaging longitudinal adjustment of the second measure, a gage ring rotatably carried by said mounting plate, a second face plate carried by the mounting plate and rotatably holding the gage ring thereon, a train of gearing carried by the second face plate with one gear engaging the gage ring for turning the gage ring to adjusted positions, a housing carried by the second face plate, a dial within the housing, and a pointer carried by the train of gearing in operative relation to the dial for indicating the extent to which the gage ring has been adjusted when motion is imparted to the gearing.

11. An instrument for measuring lengths and angles comprising a linear measure having a ring at one end, a second linear measure, and a mounting for pivotally and slidably connecting said measures, said mounting consisting of a structure having a foundation plate, a mounting plate disposed against said foundation plate, said ring being rotatably mounted between the foundation plate and mounting plate to mount the first means for swinging movement to angularly adjusted positions, a face plate disposed against the foundation plate at the other side thereof from the mounting plate, the second measure extending between the face plate and foundation plate and slidable longitudinally radially thereof, an opening being formed in the face plate for exposing a portion of the second measure, a gage carried by the face plate at the opening for gaging longitudinal adjustment of the second measure, a gage ring rotatably carried by said mounting plate, a second face plate carried by the mounting plate and rotatably holding the gage ring thereon, an opening being formed centrally of the second face plate, a bridge spanning the opening of the second face plate, a gear rotatably carried by the second face plate between the mounting plate and second face plate and meshing with the gage ring, a pinion having a stem journaled through the second face plate and rotatable from its outer end, said pinion meshing with said gear for rotating the gear and turning the gage ring to an adjusted position, a train of gearing carried by said bridge with one of its gears meshing with the first gear whereby the train of gearing will be driven when the first gear is rotated, a housing carried by the second face plate and enclosing the gearing and bridge and opening of the second face plate, a dial in said housing, and pointers carried by the train of gearing and disposed over the dial for indicating the extent to which the gage ring is turned when adjusted by rotation of the pinion and first gear.

ARTHUR E. IKE.